No. 728,477. Patented May 19, 1903.

UNITED STATES PATENT OFFICE.

AUGUST LEOPOLD LASKA, OF OFFENBACH-ON-THE-MAIN, GERMANY, ASSIGNOR TO THE FIRM OF K. OEHLER, ANILIN- & ANILINFARBEN-FABRIK, OF OFFENBACH-ON-THE-MAIN, GERMANY.

BLUE DISAZO DYE.

SPECIFICATION forming part of Letters Patent No. 728,477, dated May 19, 1903.

Application filed November 11, 1902. Serial No. 130,872. (Specimens.)

*To all whom it may concern:*

Be it known that I, AUGUST LEOPOLD LASKA, doctor of philosophy, chemist, residing at 5 Gerberstrasse, Offenbach-on-the-Main, in the Grand Duchy of Hesse, Germany, have invented new and useful Improvements in Blue Disazo Dyes, of which the following is a specification.

My invention is based on the discovery that new disazo dyestuffs are obtained by combining the intermediate products from paradiamins and the glycins of amidonaphthol sulfonic acids with beta-naphthol or naphthol sulfonic acids, the constitution of these dyestuffs being represented by the following general formula:

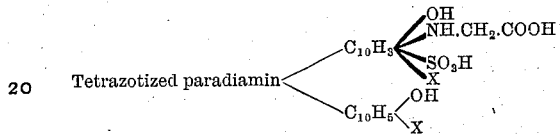

"X" meaning a hydrogen atom or a sulfo group. As paradiamins may be employed benzidin, tolidin, dianisidin, paraphenylenediamin, and as glycins those of the amidonaphthol sulfonic acids susceptible of combining with diazo compounds. The coloring-matters thus resulting dye unmordanted cotton in pure-blue shades distinguished by good fastness to light and acids.

The following example illustrates the nature of my invention and in which manner it may be carried out into practical effect:

12.2 parts of dianisidin are dissolved in a solution of 28.6 parts of hydrochloric acid of 20° Baumé and three hundred parts of water, cooled with ice, and diazotized by means of 6.9 parts of sodium nitrite. Then the mixture is poured in an ice-cold soda-alkaline solution of the glycin of the 1:8-amidonaphthol-3:6-disulfonic acid. The intermediate product is thus quickly formed and sufficiently soluble. Add to it a solution of 7.5 parts of beta-naphthol made alkaline by sodium. For completing the formation of the dyestuff the mixture is stirred for twelve hours, heated up to 80° centigrade, precipitated with common salt, pressed, and dried. The dyestuff thus obtained forms a brownish-black powder, being easily soluble in water with a blue color and dyeing on cotton fast-blue shades.

Instead of the beta-naphthol equimolecular proportions of a naphthol sulfonic acid may be used, and the glycin of the 1:8-amidonaphthol-3:6-disulfonic acid may be replaced by a glycin of another amidonaphthol sulfonic acid.

Now what I claim, and desire to secure by Letters Patent, is the following:

1. The manufacture and production of blue substantive disazo coloring-matters, the constitution of which is represented by the following general formula:

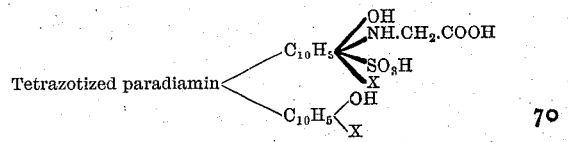

wherein "X" means a hydrogen atom or a sulfo group, consisting in the combination of the intermediate product from paradiamins and the glycins of amidonaphthol sulfonic acids with a naphthol body.

2. As new articles of manufacture the blue disazo dyestuffs, the constitution of which is shown by the following general formula:

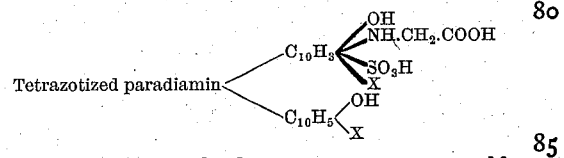

"X" meaning a hydrogen atom or a sulfo group, which are obtained by the combination of the intermediate products from a paradiamin and a glycin of an amidonaphthol sulfonic acid with a naphthol body soluble in water with a reddish-blue to blue color and dyeing unmordanted cotton in fast-blue shades.

3. As a new article of manufacture, the dyestuff represented by the following scheme:

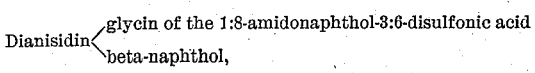

forming a brownish-black powder, dissolving in water to a blue solution, which becomes redder on addition of soda-lye and precipitates violet flocks on addition of hydrochloric acid, dissolving in concentrated sulfuric acid with a bluish-green color, and dyeing unmordanted cotton in blue shades very fast to light and acids.

In testimony whereof I have signed my name to this specification in the presence of two subscribing witnesses.

AUGUST LEOPOLD LASKA.

Witnesses:
OSKUR STUNDHARDT,
EVA SATTLER.